United States Patent
Yoo et al.

(10) Patent No.: US 9,100,231 B2
(45) Date of Patent: Aug. 4, 2015

(54) HYBRID APPROACH FOR PHYSICAL DOWNLINK SHARED CHANNEL (PDSCH) INTERFERENCE CANCELLATION

(71) Applicant: QUALCOMM Incorporated, San Diego, CA (US)

(72) Inventors: Taesang Yoo, San Diego, CA (US); Tao Luo, San Diego, CA (US); Hendrik Schoeneich, Nuremberg (DE); Myriam Rajih, Nuremberg (DE); Lu Zhao, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/666,325

(22) Filed: Nov. 1, 2012

(65) Prior Publication Data

US 2013/0115987 A1 May 9, 2013

Related U.S. Application Data

(60) Provisional application No. 61/556,132, filed on Nov. 4, 2011.

(51) Int. Cl.
*H04B 15/00* (2006.01)
*H04L 25/03* (2006.01)
(Continued)

(52) U.S. Cl.
CPC ......... *H04L 25/0328* (2013.01); *H04J 11/0056* (2013.01); *H04L 25/03305* (2013.01); *H04L 1/0048* (2013.01)

(58) Field of Classification Search
CPC . H04J 11/0056; H04J 11/005; H04J 11/0023; H04J 11/0026; H04J 11/0053; H04J 11/0059; H04J 11/0063; H04L 1/0048; H04L 25/0328; H04L 25/03305
USPC ........ 455/63.1, 67.13, 69, 522; 370/335, 320, 370/329, 260, 252; 375/260, 148, 267, 340, 375/346, 144, 147
See application file for complete search history.

(56) References Cited

U.S. PATENT DOCUMENTS 3,950,751 A * 4/1976 Orr et al. .......................... 342/17
8,218,697 B2 7/2012 Guess et al.
(Continued)

FOREIGN PATENT DOCUMENTS

EP 2352236 A1 8/2011
JP 2003008549 A 1/2003

OTHER PUBLICATIONS

Boudreau, et al., "Interference Coordination and Cancellation for 4G Networks", IEEE Communications Magazine, vol. 47, No. 4, Apr. 2009, pp. 74-81.
(Continued)

*Primary Examiner* — Tan Trinh
(74) *Attorney, Agent, or Firm* — Patterson & Sheridan, L.L.P.

(57) ABSTRACT

Certain aspects of the present disclosure relate to a hybrid approach for Physical Downlink Shared Channel (PDSCH) Interference Cancellation (IC). In certain aspects, if the PDSCH information is known for a serving cell but not be known for interfering cell(s), a hybrid approach that involves using Codeword-level IC (CWIC) for the serving cell and using Symbol-level IC (SLIC) for the interfering cells may be used for better IC performance. The hybrid IC approach may start with a UE attempting to decode the serving cell PDSCH. If the decode is unsuccessful, the UE may perform CWIC for the serving cell followed by SLIC using the results of the CWIC stage. After the SLIC stage, the UE may attempt to decode the serving cell PDSCH again. The UE may perform multiple operations of this method until the serving cell PDSCH is successfully decoded or a maximum number of iterations is reached.

31 Claims, 9 Drawing Sheets

(51) Int. Cl.
*H04J 11/00* (2006.01)
*H04L 1/00* (2006.01)

(56) References Cited

U.S. PATENT DOCUMENTS

| | | | |
|---|---|---|---|
| 2005/0213529 A1* | 9/2005 | Chow et al. | 370/320 |
| 2006/0133521 A1* | 6/2006 | Sampath et al. | 375/260 |
| 2007/0011550 A1* | 1/2007 | Agrawal et al. | 714/746 |
| 2007/0110134 A1* | 5/2007 | Guess et al. | 375/148 |
| 2007/0110137 A1* | 5/2007 | Guess et al. | 375/148 |
| 2008/0043680 A1* | 2/2008 | Fitton | 370/335 |
| 2009/0046786 A1* | 2/2009 | Moulsley et al. | 375/260 |
| 2010/0011269 A1* | 1/2010 | Budianu et al. | 714/748 |
| 2010/0069010 A1* | 3/2010 | Karakayali et al. | 455/63.1 |
| 2010/0080323 A1 | 4/2010 | Mueck et al. | |
| 2010/0309868 A1* | 12/2010 | Yang et al. | 370/329 |
| 2012/0201162 A1* | 8/2012 | Kim et al. | 370/252 |
| 2012/0224499 A1* | 9/2012 | Yoo et al. | 370/252 |
| 2013/0114437 A1* | 5/2013 | Yoo et al. | 370/252 |
| 2014/0098773 A1* | 4/2014 | Yoo et al. | 370/329 |
| 2014/0204857 A1* | 7/2014 | Mallik et al. | 370/329 |
| 2014/0301251 A1* | 10/2014 | Chen et al. | 370/278 |

OTHER PUBLICATIONS

International Search Report and Written Opinion—PCT/US2012/063162—ISA/EPO—Dec. 12, 2012.

* cited by examiner

HYBRID APPROACH FOR PHYSICAL DOWNLINK SHARED CHANNEL (PDSCH) INTERFERENCE CANCELLATION

The present Application for Patent claims priority to U.S. Provisional Application No. 61/556,132, entitled "HYBRID APPROACH FOR PHYSICAL DOWNLINK SHARED CHANNEL (PDSCH) INTERFERENCE CANCELLATION (IC)," filed Nov. 4, 2011, and assigned to the assignee hereof and hereby expressly incorporated by reference herein.

BACKGROUND

1. Field

The present disclosure relates generally to communication systems, and more particularly, to a hybrid approach for Physical Downlink Shared Channel (PDSCH) Interference Cancellation (IC).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication. The method generally includes performing an iteration of hybrid interference cancelation based decoding and repeating the iteration of the hybrid interference cancelation based decoding until an attempt to decode the data transmitted from the first cell is successful or a maximum number of iterations has been reached. The performing the iteration of hybrid interference cancelation based decoding generally comprising attempting to decode data transmitted from a first cell; if the attempt to decode is unsuccessful, performing a first type of interference cancellation using results of the attempt to decode data transmitted from the first cell to reduce interference caused by data transmitted from the first cell; attempting to process data transmitted from at least a second cell after performing the first type of interference cancellation; and performing a second type of interference cancellation using results of the attempt to process data transmitted from the second cell to reduce interference caused by data transmitted from the second cell.

Certain aspects of the present disclosure provide an apparatus for wireless communication. The apparatus generally includes means for performing an iteration of hybrid interference cancelation based decoding and means for repeating the iteration of the hybrid interference cancelation based decoding until an attempt to decode the data transmitted from the first cell is successful or a maximum number of iterations has been reached. The means for performing the iteration of hybrid interference cancelation based decoding generally comprising means for attempting to decode data transmitted from a first cell; means for performing a first type of interference cancellation using results of the attempt to decode data transmitted from the first cell to reduce interference caused by data transmitted from the first cell, if the attempt to decode is unsuccessful; means for attempting to process data transmitted from at least a second cell after performing the first type of interference cancellation; and means for performing a second type of interference cancellation using results of the attempt to process data transmitted from the second cell to reduce interference caused by data transmitted from the second cell.

Certain aspects of the present disclosure provide a computer program product for wireless communication, the computer program product generally including computer-readable medium comprising code. The code generally includes code for performing an iteration of hybrid interference cancelation based decoding, comprising and repeating the iteration of the hybrid interference cancelation based decoding until an attempt to decode the data transmitted from the first cell is successful or a maximum number of iterations has been reached. The code for performing the iteration of hybrid interference cancelation based decoding generally comprising attempting to decode data transmitted from a first cell; if the attempt to decode is unsuccessful, performing a first type of interference cancellation using results of the attempt to decode data transmitted from the first cell to reduce interference caused by data transmitted from the first cell; attempting to process data transmitted from at least a second cell after performing the first type of interference cancellation; and performing a second type of interference cancellation using results of the attempt to process data transmitted from the second cell to reduce interference caused by data transmitted from the second cell.

Certain aspects of the present disclosure provide an apparatus for wireless communication. The apparatus generally includes a processing system configured to perform an iteration of hybrid interference cancelation based decoding, comprising and repeat the iteration of the hybrid interference cancelation based decoding until an attempt to decode the data transmitted from the first cell is successful or a maximum number of iterations has been reached. The processing system is configured to perform an iteration of hybrid interference cancelation based decoding by attempting to decode data transmitted from a first cell; if the attempt to decode is unsuccessful, performing a first type of interference cancellation using results of the attempt to decode data transmitted from the first cell to reduce interference caused by data transmitted from the first cell; attempting to process data transmitted from at least a second cell after performing the first type of interference cancellation; and performing a second type of interference cancellation using results of the attempt to process data transmitted from the second cell to reduce interference caused by data transmitted from the second cell.

Certain aspects of the present disclosure provide a method for wireless communications. The method generally includes performing a first attempt to decode data transmitted from a first cell; if the first attempt to decode is unsuccessful, performing a first type of interference cancellation using results of the first attempt to decode data transmitted from the first cell to reduce interference caused by data transmitted from the first cell; attempting to process data transmitted from at least a second cell after performing the first type of interference cancellation; performing a second type of interference cancellation using results of the attempt to process data transmitted from the second cell to reduce interference caused by data transmitted from the second cell; and performing a second attempt to decode data transmitted in the first cell after performing the second type of interference cancellation.

Certain aspects of the present disclosure provide an apparatus for wireless communication. The apparatus generally includes means for performing a first attempt to decode data transmitted from a first cell; means for performing a first type of interference cancellation using results of the first attempt to decode data transmitted from the first cell to reduce interference caused by data transmitted from the first cell, if the first attempt to decode is unsuccessful; means for attempting to process data transmitted from at least a second cell after performing the first type of interference cancellation; means for performing a second type of interference cancellation using results of the attempt to process data transmitted from the second cell to reduce interference caused by data transmitted from the second cell; and means for performing a second attempt to decode data transmitted in the first cell after performing the second type of interference cancellation.

Certain aspects of the present disclosure provide a computer program product for wireless communication, the computer program product generally including computer-readable medium comprising code. The code generally includes code for performing a first attempt to decode data transmitted from a first cell; if the first attempt to decode is unsuccessful, performing a first type of interference cancellation using results of the first attempt to decode data transmitted from the first cell to reduce interference caused by data transmitted from the first cell; attempting to process data transmitted from at least a second cell after performing the first type of interference cancellation; performing a second type of interference cancellation using results of the attempt to process data transmitted from the second cell to reduce interference caused by data transmitted from the second cell; and performing a second attempt to decode data transmitted in the first cell after performing the second type of interference cancellation.

Certain aspects of the present disclosure provide an apparatus for wireless communication. The apparatus generally includes a processing system configured to perform a first attempt to decode data transmitted from a first cell; if the first attempt to decode is unsuccessful, perform a first type of interference cancellation using results of the first attempt to decode data transmitted from the first cell to reduce interference caused by data transmitted from the first cell; attempt to process data transmitted from at least a second cell after performing the first type of interference cancellation; perform a second type of interference cancellation using results of the attempt to process data transmitted from the second cell to reduce interference caused by data transmitted from the second cell; and perform a second attempt to decode data transmitted in the first cell after performing the second type of interference cancellation.

DETAILED DESCRIPTION

Figure 1:
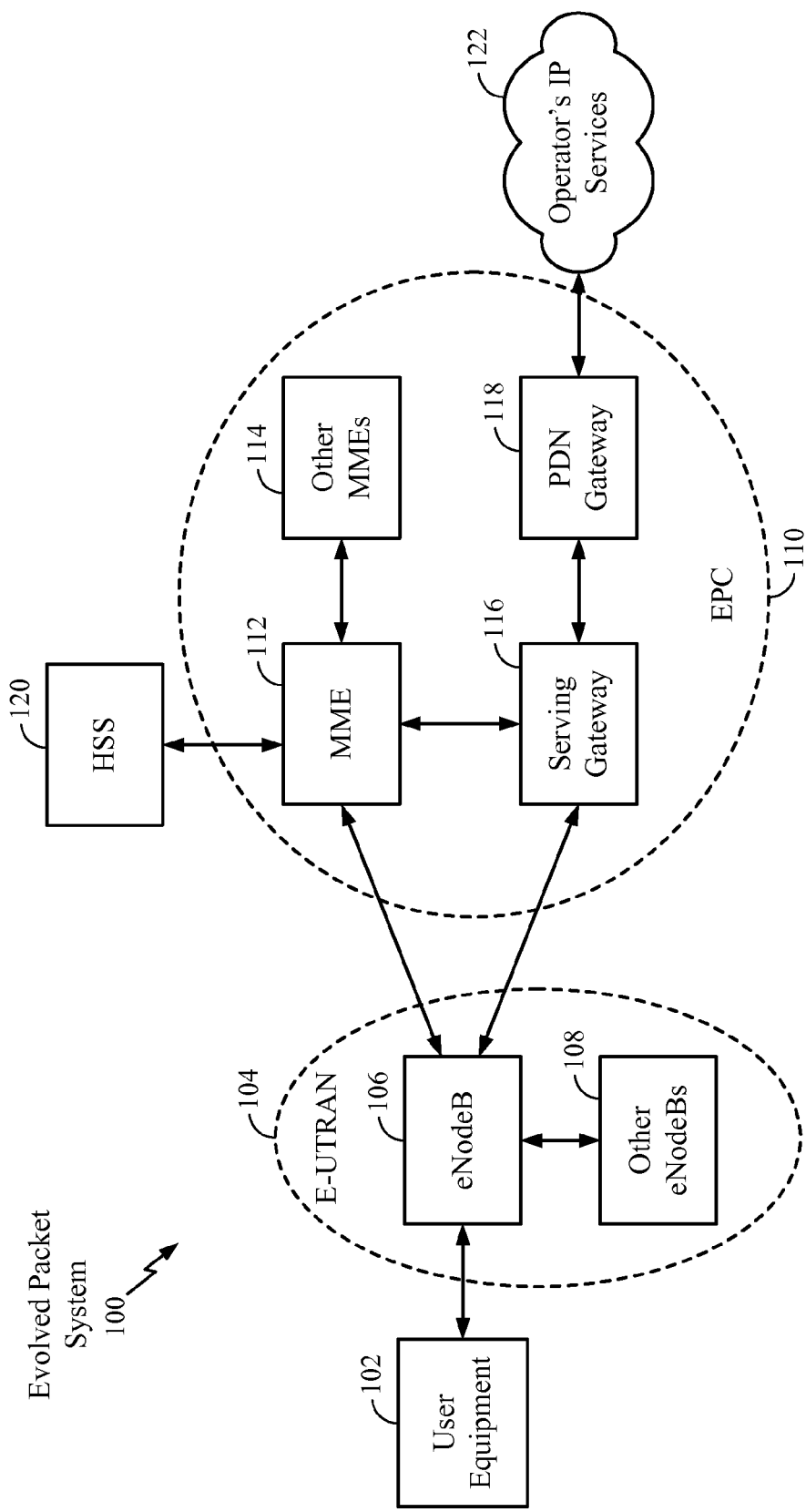
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
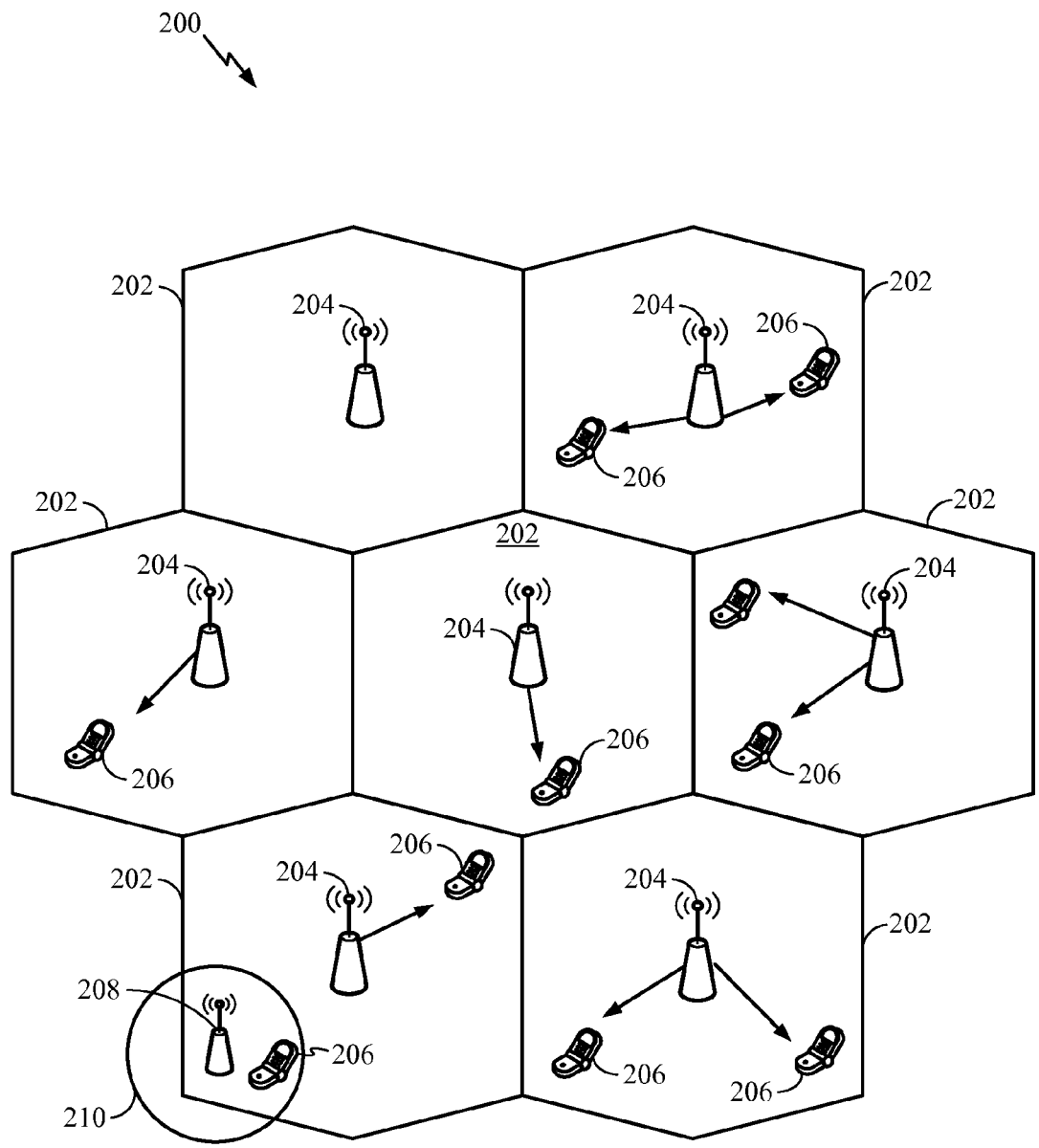
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
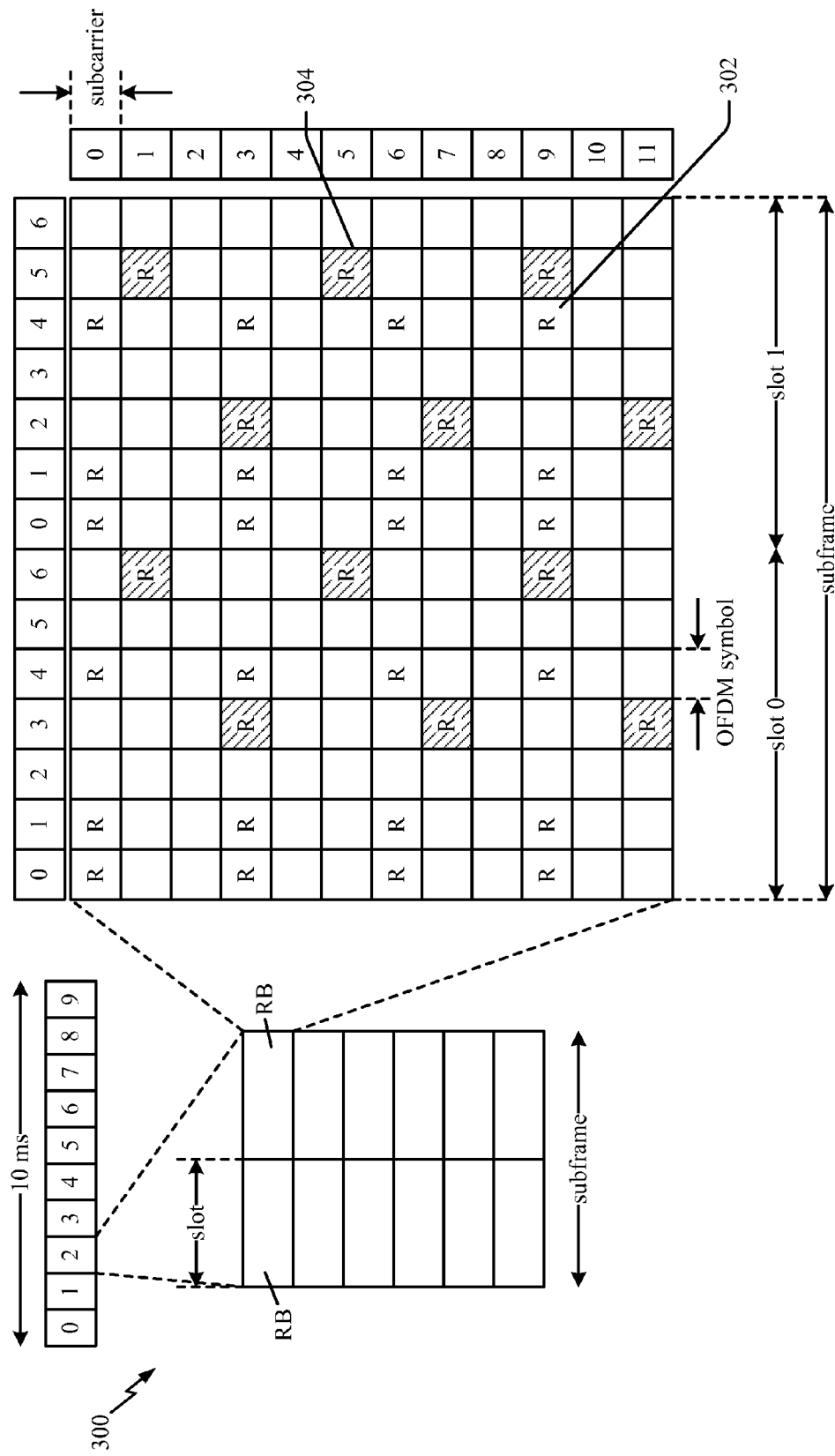
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
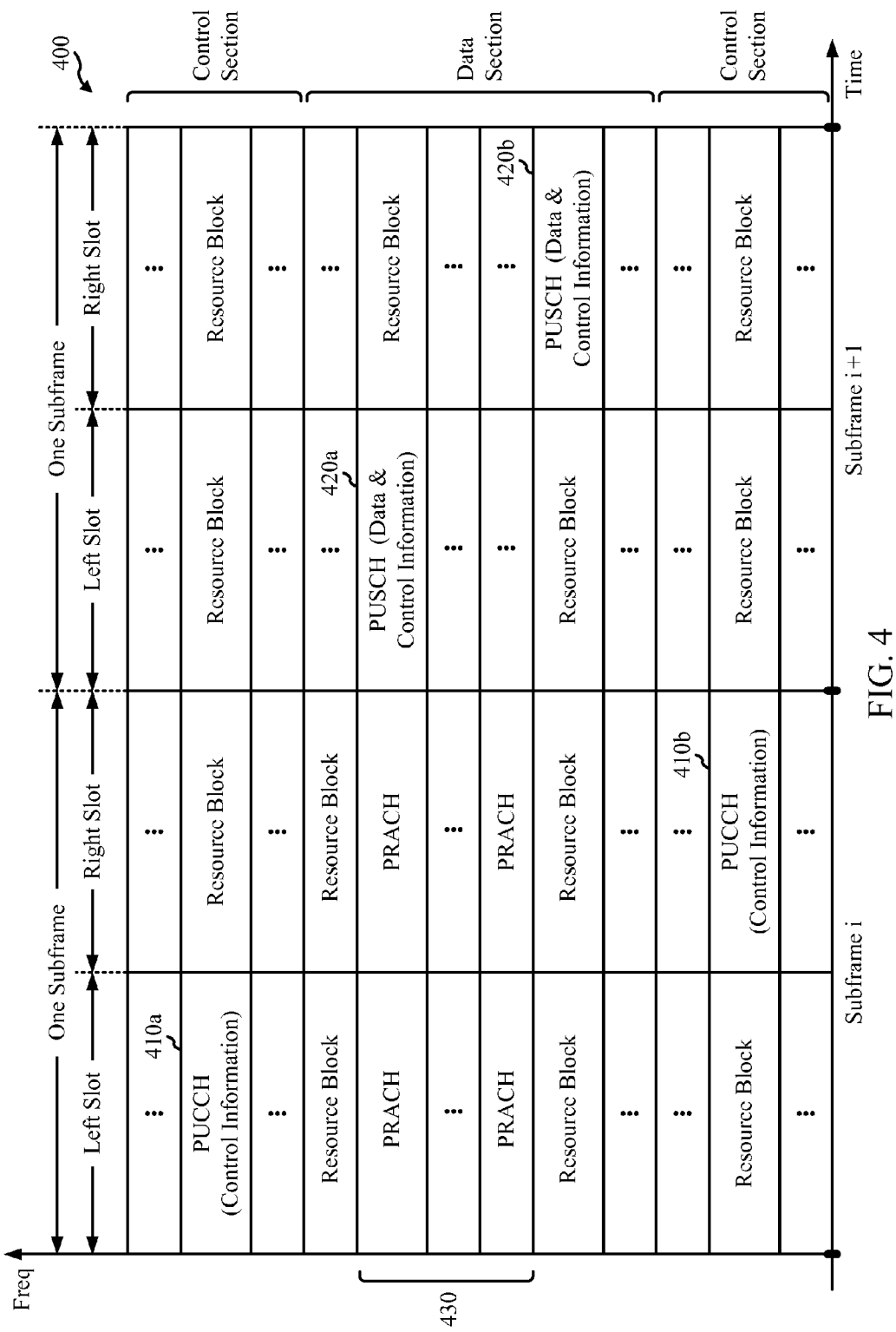
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
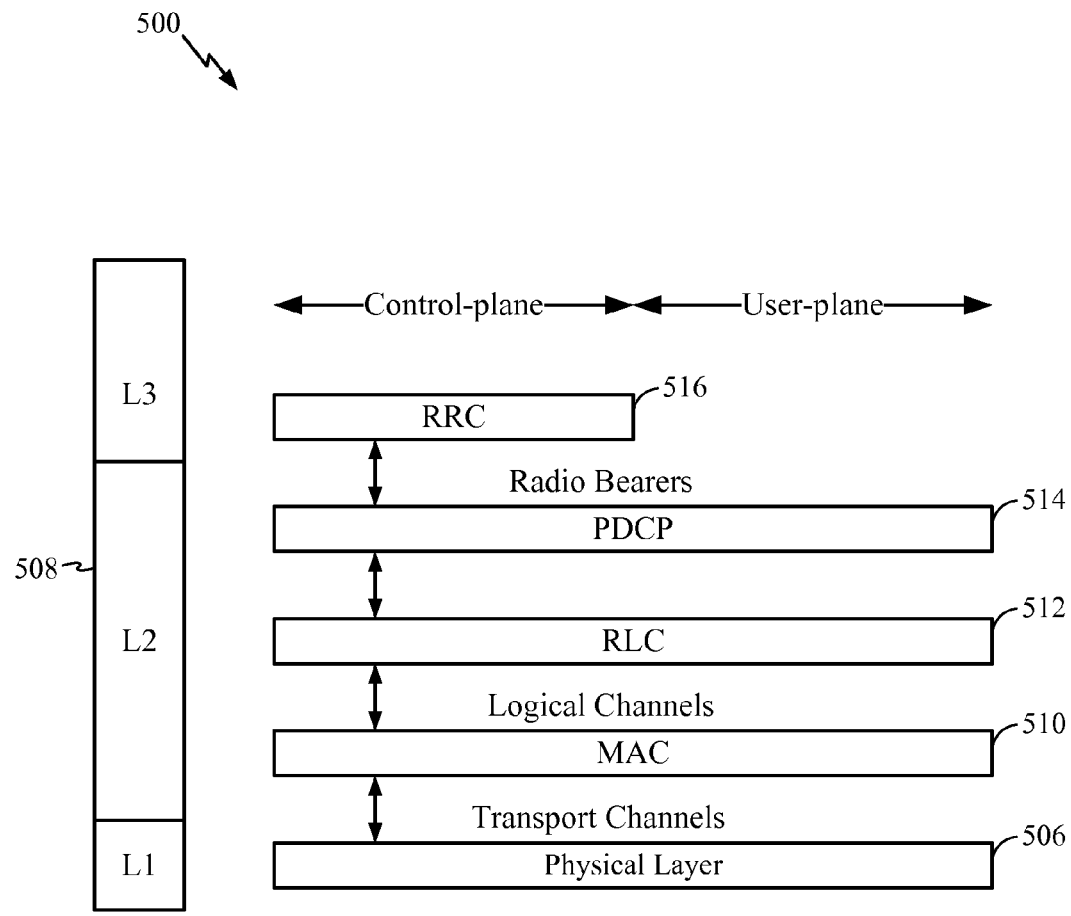
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
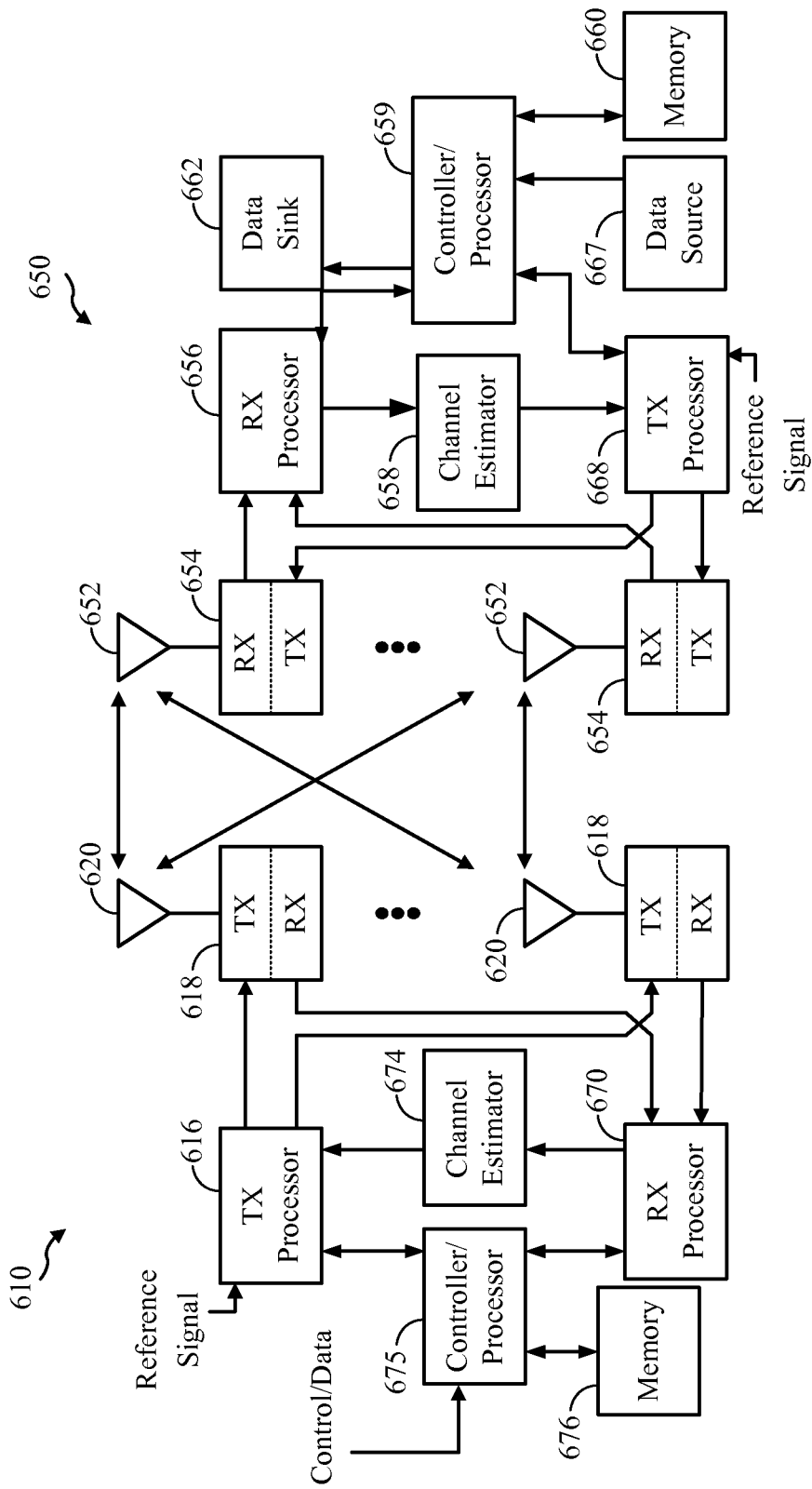
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Hybrid Approach for Physical Downlink Shared Channel (PDSCH) Interference Cancellation (IC)

A promising way to improve spectral efficiency in LTE/LTE-A downlink (DL) is interference cancellation (IC). IC may be applied to all physical channels and signals, for example, Primary Synchronization Sequence (PSS), Secondary Synchronization Sequence (SSS), Physical Broadcast Channel (PBCH), Common Reference Signal (CRS), Dedicated Reference signal (DRS), Channel State Information-Reference Signal (CSI-RS), Physical Control Format Indicator Channel (PCFICH), Physical Hybrid ARQ Indicator Channel (PHICH), Physical Downlink Control Channel (PDCCH), Physical Downlink Shared Channel (PDSCH) and the like.

In certain aspects, there are two different schemes for performing IC, Codeword-level IC (CWIC) and Symbol-level IC (SLIC). In CWIC, a UE detects and decodes interfering data from a received interfering signal and cancels the interfering signal. In SLIC, the UE detects the interfering modulation symbols from the received interfering signal and cancels them without decoding the signal.

The CWIC typically uses a Turbo decoder or Convolutional decoder for the decoding operation, and generally provides a better Log Likelihood Ratio (LLR) value as compared to the SLIC where there is no coding gain. However, the CWIC requires information regarding an interfering signal. For example, for a PDSCH IC, the CWIC may require information relating to a modulation and coding scheme (MCS), spatial scheme, redundancy version (RV), and resource block (RB) assignment information regarding an interfering PDSCH. Generally, for a serving cell, the UE may know the PDSCH information by decoding its control channel (e.g. the PDCCH).

In certain aspects, this information may not be available to the UE, e.g for interfering cells. In such cases, the SLIC may be employed since the SLIC requires less PDSCH information of the interfering cell. For example, for a PDSCH IC, the SLIC may require a modulation order and spatial scheme, but not necessarily the MCS (which denotes the combination of modulation order and coding scheme), redundancy version, or the resource block assignment. In an aspect, the UE may perform a blind detection to figure out the PDSCH information of the interfering cell. In particular, the modulation order and spatial scheme may be blindly detected with relative ease. However, the coding scheme (hence MCS) and redundancy version may be harder to detect blindly. Therefore, SLIC may still be employed with blind detection even when the PDSCH information regarding an interfering signal is not available. However, CWIC is difficult to be employed unless the PDSCH information is provided, as it is difficult to blindly detect some of the aforementioned information.

Since the SLIC does not require decoding and re-encoding, it generally involves lower implementation complexity as compared to the CWIC. However, the CWIC generally performs better than SLIC.

In certain aspects, the simplest form of IC when there are strong interferers for the serving cell is to cancel out the interfering signals and decode the serving cell PDSCH. In certain aspects, an iterative IC approach with sequential and repetitive use of IC between the serving cell and strong interferers may be used for better IC performance. An iterative IC is applicable to both SLIC (i.e. iterative SLIC) and CWIC (i.e. iterative CWIC). Iterative CWIC may provide a large gain due to the coding gain obtained in the decoding and re-encoding process of each IC stage. However, CWIC may be difficult to employ in case the interfering PDSCH information is not available. Iterative SLIC, on the other hand, provides limited gain, as the iteration is confined to a given symbol without any coding gain, but may be employed with relative ease with little PDSCH information.

In certain aspects of iterative IC, considering that the PDSCH information is known for the serving cell but may not be known for interfering cells, a hybrid approach that involves using CWIC for the serving cell and using SLIC for the interfering cells may be used for better IC performance.

The iterative IC may start with the UE decoding the serving cell PDCCH. A CWIC stage may then try to decode the serving cell PDSCH based on control information obtained from decoding the PDCCH. If a cyclic redundancy check (CRC) fails, i.e. if the UE is unable to successfully decode the serving cell PDSCH, the UE performs CWIC of the serving cell signal. That is, the UE uses the LLR values resulting from the decoder output to reconstruct the serving cell PDSCH symbols and then subtracts (cancels) it from the received signal as best as possible to get a cleaner interfering signal (e.g. interfering PDSCH). This cleaner interfering signal is then used by a SLIC stage to perform SLIC for the interfering PDSCH. This may include attempting to estimate (e.g., detect or decode) the interfering PDSCH and subsequently cancel the interfering PDSCH from the received signal. In certain aspects, the cleaner interfering signal may lead to a better estimation of the interfering signal in the SLIC stage. The results of the SLIC stage (e.g., received signal with interfering PDSCH cancelled) may then be used by the CWIC stage to again attempt to decode the serving cell PDSCH. In an aspect, if the CRC fails again, another iteration of the CWIC for the serving cell signal and subsequent SLIC for the interfering cell signal may be performed, before attempting to decode the serving cell PDSCH again. This process may be repeated several times (i.e. multiple iterations) until the serving cell PDSCH is decoded successfully. As a result of using a combination of CWIC and SLIC, the CWIC stage provides a coding gain to the SLIC stage which benefits from the serving cell signal cancellation.

In certain aspects, the above hybrid IC approach may be applied to any number of cells interfering with the serving cell. For every iteration, the UE may perform IC for signals from each of the interfering cells (in any order) before attempting to decode the serving cell signal. In an aspect, each IC stage may use the results from a previous IC stage. Further, the UE may decide to perform CWIC or SLIC for a particular interfering cell based on whether control information regarding PDSCH is available for that cell. For example, the UE may perform CWIC for interfering cells for which PDSCH information is available, and perform SLIC for the interfering cells for which PDSCH information is unavailable.

In certain aspects, the CWIC stage for decoding the serving cell PDSCH may include multiple decoding iterations. For example, the CWIC stage may use multiple Turbo code iterations for decoding the serving cell PDSCH. In certain aspects, for the above iterative IC, the CWIC stage may use a different number of Turbo code iterations as compared to a case when there is no serving cell PDSCH IC operation to reduce complexity. For example, a nominal PDSCH decoding may require N iterations of the Turbo decoder. However, when the iterative IC approach noted above is used, the CWIC stage may use M (typically <N) iterations of the Turbo decoder for decoding its serving cell PDSCH. A decision regarding using M iterations vs. N iterations may depend on common reference signal (CRS) power difference between serving and interfering cell. For example, Reference Signal Received Power (RSRP) measurement from serving cell and interfering cell may be used to determine the number of iterations.

In certain aspects, clearer is the serving cell signal, lesser are the Turbo code iterations used to decode the serving cell PDSCH.

Figure 7:
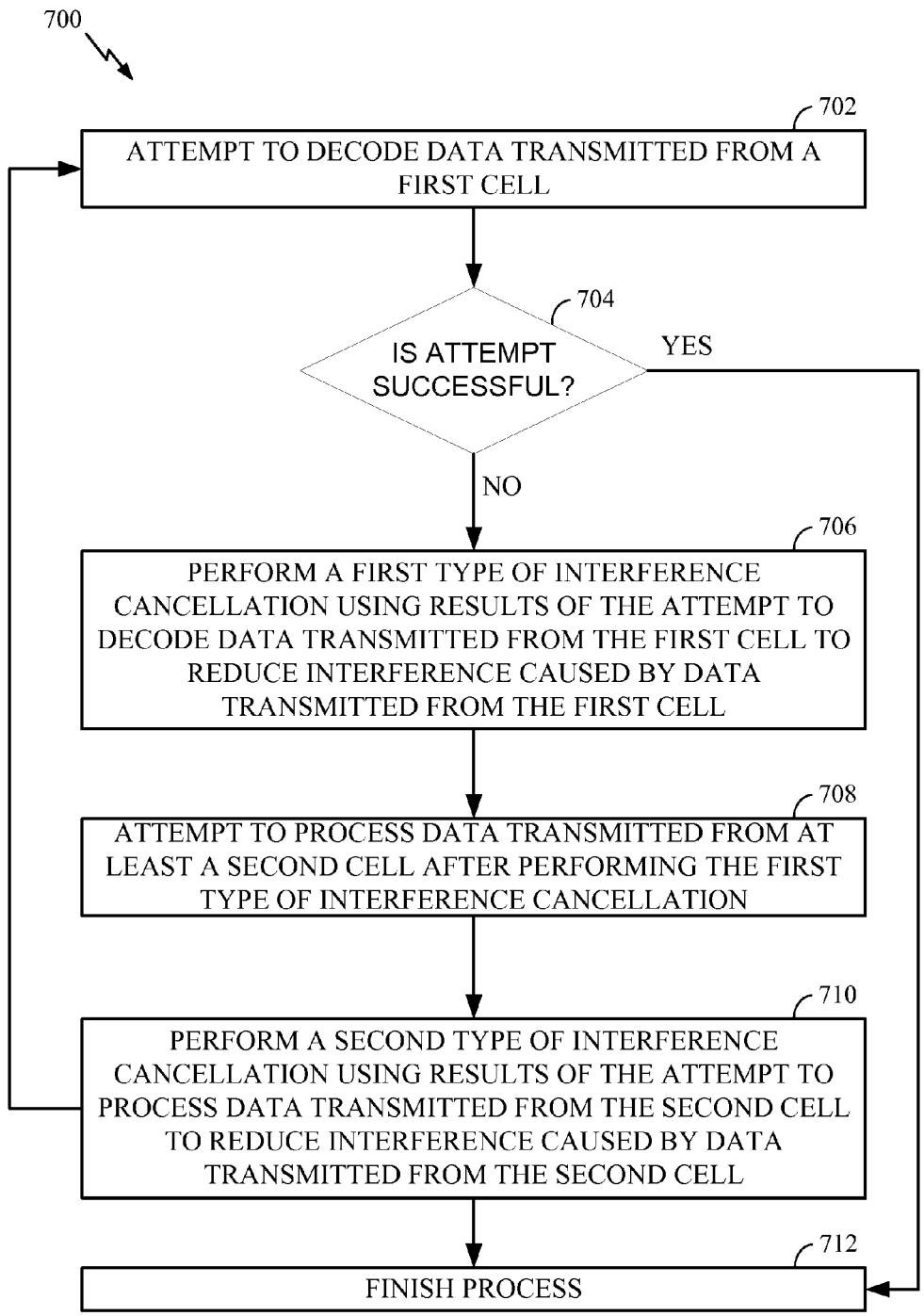
FIG. 7 illustrates a flow diagram of a method of hybrid PDSCH IC in accordance with certain aspects of the disclosure.

FIG. 7 illustrates example operations 700 that may be performed by a UE for hybrid PDSCH IC in accordance with certain aspects of the disclosure. In an aspect the UE may include UEs 102, 206, or 650 shown in FIGS. 1, 2 and 6 respectively.

Operations 700 begin, at 702, by performing an attempt to decode data transmitted from a first cell. At 704, if the attempt to decode is successful, the operations finish at 712. However, if the attempt to decode is unsuccessful, at 706, a first type of interference cancellation is performed using results of the attempt to decode data transmitted from the first cell to reduce interference caused by data transmitted from the first cell. At 708, it is attempted to process data transmitted from at least a second cell after performing the first type of interference cancellation. At 710, a second type of interference cancellation is performed using results of the attempt to process data transmitted from the second cell to reduce interference caused by data transmitted from the second cell. At 702, another attempt to decode data transmitted in the first cell is performed after performing the second type of interference cancellation. In an aspect, the UE may run multiple iterations of the operations 700 until it successfully decodes data transmitted from the first cell or if a maximum number of iterations is reached.

In an aspect, after performing the second type of interference cancellation for the second cell, the UE may attempt to process data transmitted from a third interfering cell, and perform the first type of interference cancellation using results of the attempt to process data transmitted from the third cell to reduce interference caused by data transmitted from the third cell. In aspect, the UE may have control information regarding the data transmitted from the third cell, and the data transmitted from the third cell may be decoded based on the control information.

In an aspect, the first type of interference cancellation may include CWIC, and the second type of interference cancellation may include SLIC.

Figure 8:
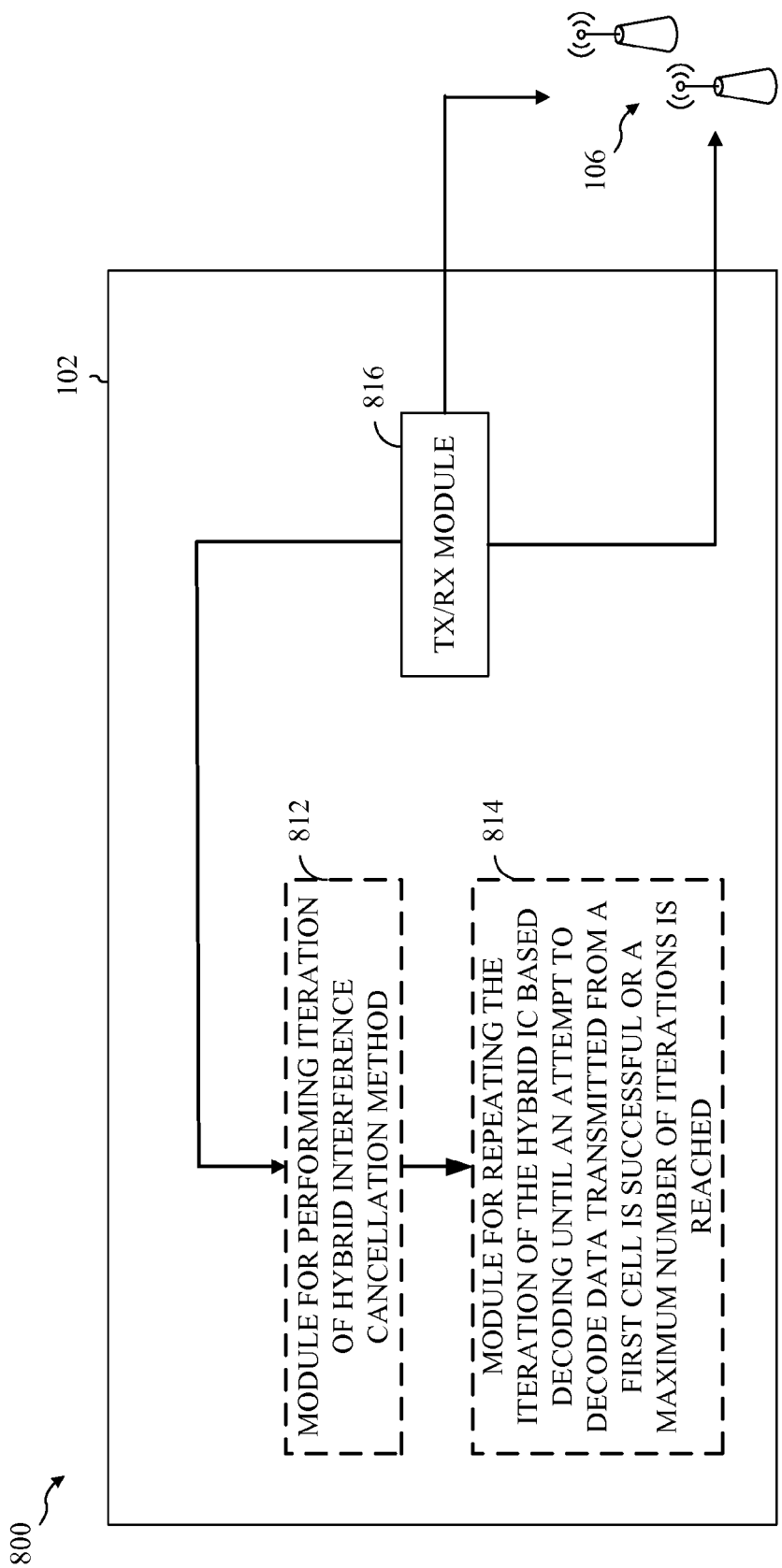
FIG. 8 is a conceptual data flow diagram illustrating the data flow between different modules/means/components in an exemplary apparatus in accordance with certain aspects of the disclosure.

FIG. 8 is a conceptual data flow diagram 800 illustrating the data flow between different modules/means/components in an exemplary apparatus (e.g., UE 102). The UE 102 includes a module 812 for performing an iteration of hybrid interference cancelation based decoding, a module 814 for repeating the iteration of the hybrid interference cancelation based decoding until an attempt to decode the data transmitted from the first cell is successful or a maximum number of iterations has been reached, and a transceiver module 816 for transmitting signals to and receiving signals from one or more eNBs 106.

Figure 9:
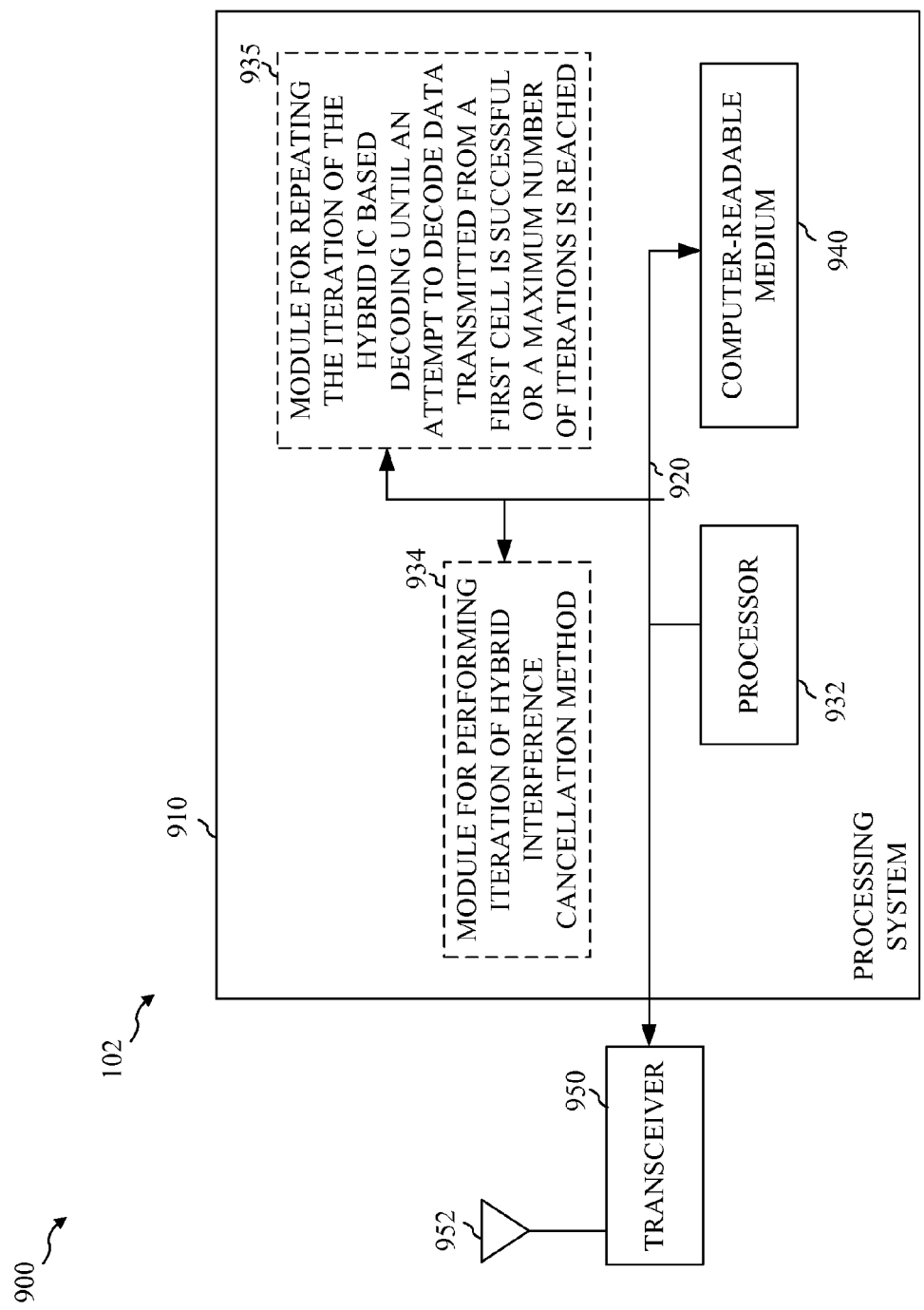
FIG. 9 is a diagram illustrating an example of a hardware implementation for an apparatus employing a processing system in accordance with certain aspects of the disclosure.

The modules may be one or more hardware components specifically configured to carry out the stated processes/algorithm, implemented by a processor configured to perform the stated processes/algorithm, stored within a computer-readable medium for implementation by a processor, or some combination thereof FIG. 9 is a diagram illustrating an example of a hardware implementation for an apparatus 900 for an apparatus (e.g., UE 102) employing a processing system 910. The processing system 910 may be implemented with a bus architecture, represented generally by the bus 920. The bus 920 may include any number of interconnecting buses and bridges depending on the specific application of the processing system 910 and the overall design constraints. The bus 920 links together various circuits including one or more processors and/or hardware modules, represented by the processor 932, the modules 934, 935, and the computer-readable medium 940. The bus 920 may also link various other circuits such as timing sources, peripherals, voltage regulators, and power management circuits, which are well known in the art, and therefore, will not be described any further.

The processing system 910 is coupled to a transceiver 950. The transceiver 950 is coupled to one or more antennas 952. The transceiver 950 provides a means for communicating with various other apparatus over a transmission medium. The processing system 910 includes a processor 932 coupled to a computer-readable medium 940. The processor 932 is responsible for general processing, including the execution of software stored on the computer-readable medium 940. The software, when executed by the processor 932, causes the processing system 910 to perform the various functions described supra for any particular apparatus. The computer-readable medium 940 may also be used for storing data that is manipulated by the processor 932 when executing software. The processing system further includes modules 934 and 935. The modules may be software modules running in the processor 932, resident/stored in the computer readable medium 940, one or more hardware modules coupled to the processor 932, or some combination thereof. The processing system 910 may be a component of the UE 650 and may include the memory 660 and/or at least one of the TX processor 668, the RX processor 656, and the controller/processor 659.

In one configuration, the apparatus 800/900 for wireless communication includes means for performing each of the functions in FIG. 7. The aforementioned means may be one or more of the aforementioned modules of the apparatus 800 and/or the processing system 910 of the apparatus 900 configured to perform the functions recited by the aforementioned means. As described supra, the processing system 910 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication, comprising:
performing an iteration of hybrid interference cancelation based decoding, comprising:
attempting to decode data transmitted from a first cell;
if the attempt to decode is unsuccessful, performing a first type of interference cancellation using results of the attempt to decode data transmitted from the first cell to reduce interference caused by data transmitted from the first cell;
attempting to process data transmitted from at least a second cell after performing the first type of interference cancellation; and
performing a second type of interference cancellation using results of the attempt to process data transmitted from the second cell to reduce interference caused by data transmitted from the second cell, wherein the first type of interference cancellation is different than the second type of interference cancellation; and
repeating the iteration of the hybrid interference cancelation based decoding until an attempt to decode the data transmitted from the first cell is successful or a maximum number of iterations has been reached.

2. The method of claim 1, wherein the attempting to process the data transmitted from the second cell comprises:
attempting to perform at least one of detecting or decoding of the data transmitted from the second cell.

3. The method of claim 1, wherein the first cell comprises a serving cell.

4. The method of claim 1, wherein the second cell comprises an interfering cell whose transmissions interfere with transmission from the first cell.

5. The method of claim 1, wherein the first type of interference cancellation comprises a code word level interference cancellation (CWIC).

6. The method of claim 1, wherein the second type of interference cancellation comprises a symbol level interference cancellation (SLIC).

7. The method of claim 1, further comprising, before performing the attempt to decode data transmitted from the first cell:
performing a first attempt to process data transmitted from the second cell; and
performing the second type of interference cancellation using results of the first attempt to process data transmitted from the second cell to reduce interference caused by data transmitted from the second cell.

8. The method of claim 7, wherein performing the first attempt to process the data transmitted from the second cell comprises:
attempting to perform at least one of detecting or decoding the data transmitted from the second cell.

9. The method of claim 1, further comprising after performing the second type of interference cancellation:
attempting to process data transmitted from a third cell; and
performing the first type of interference cancellation using results of the attempt to process data transmitted from the third cell to reduce interference caused by data transmitted from the third cell.

10. The method of claim 9, wherein the attempting to process the data transmitted from the third cell comprises:
attempting to decode the data transmitted from the third cell based on control information.

11. The method of claim 9, wherein the third cell is an interfering cell whose transmissions interfere with transmissions from the first cell.

12. The method of claim 1, further comprising before performing the attempt to decode data transmitted from the first cell:
attempting to process data transmitted from a third cell; and
performing the first type of interference cancellation using results of the attempt to process data transmitted from the third cell to reduce interference caused by data transmitted from the third cell.

13. The method of claim 12, wherein the attempting to process the data transmitted from the third cell comprises:
attempting to decode the data transmitted from the third cell based on knowledge of control information for the third cell.

14. The method of claim 1, further comprising:
performing multiple decoding iterations to decode the data transmitted from the first cell.

15. The method of claim 14, further comprising:
determining a number of the decoding iterations based on a received power difference between a reference signal received from the first cell and a reference signal received from the second cell.

16. The method of claim 15, wherein the reference signals received from the first and the second cells comprises a common reference signal (CRS).

17. An apparatus for wireless communication, comprising:
means for performing an iteration of hybrid interference cancelation based decoding, by:
attempting to decode data transmitted from a first cell;
performing a first type of interference cancellation using results of the attempt to decode data transmitted from the first cell to reduce interference caused by data transmitted from the first cell, if the attempt to decode is unsuccessful;
attempting to process data transmitted from at least a second cell after performing the first type of interference cancellation; and
performing a second type of interference cancellation using results of the attempt to process data transmitted from the second cell to reduce interference caused by data transmitted from the second cell, wherein the first type of interference cancellation is different than the second type of interference cancellation; and
means for repeating the iteration of the hybrid interference cancelation based decoding until an attempt to decode the data transmitted from the first cell is successful or a maximum number of iterations has been reached.

18. The apparatus of claim 17, wherein the means for attempting to process the data transmitted from the second cell is configured to:
attempt to perform at least one of detecting or decoding of the data transmitted from the second cell.

19. The apparatus of claim 17, wherein the first cell comprises a serving cell.

20. The apparatus of claim 17, wherein the second cell comprises an interfering cell whose transmissions interfere with transmission from the first cell.

21. The apparatus of claim 17, wherein the first type of interference cancellation comprises a code word level interference cancellation (CWIC).

22. The apparatus of claim 17, wherein the second type of interference cancellation comprises a symbol level interference cancellation (SLIC).

23. The apparatus of claim 17, further comprising means for performing after performing the second type of interference cancellation:
attempting to process data transmitted from a third cell; and
performing the first type of interference cancellation using results of the attempt to process data transmitted from the third cell to reduce interference caused by data transmitted from the third cell.

24. The apparatus of claim 23, wherein the means for attempting to process the data transmitted from the third cell is configured to:
attempt to decode the data transmitted from the third cell based on control information.

25. The apparatus of claim 23, wherein the third cell is an interfering cell whose transmissions interfere with transmissions from the first cell.

26. A non-transitory computer-readable medium comprising code for:
performing an iteration of hybrid interference cancelation based decoding, comprising:
attempting to decode data transmitted from a first cell;
if the attempt to decode is unsuccessful, performing a first type of interference cancellation using results of the attempt to decode data transmitted from the first cell to reduce interference caused by data transmitted from the first cell;

attempting to process data transmitted from at least a second cell after performing the first type of interference cancellation; and performing a second type of interference cancellation using results of the attempt to process data transmitted from the second cell to reduce interference caused by data transmitted from the second cell, wherein the first type of interference cancellation is different than the second type of interference cancellation; and repeating the iteration of the hybrid interference cancelation based decoding until an attempt to decode the data transmitted from the first cell is successful or a maximum number of iterations has been reached.

27. An apparatus for wireless communication, comprising: a processing system configured to:

perform an iteration of hybrid interference cancelation based decoding, by:

attempting to decode data transmitted from a first cell;

if the attempt to decode is unsuccessful, performing a first type of interference cancellation using results of the attempt to decode data transmitted from the first cell to reduce interference caused by data transmitted from the first cell;

attempting to process data transmitted from at least a second cell after performing the first type of interference cancellation; and performing a second type of interference cancellation using results of the attempt to process data transmitted from the second cell to reduce interference caused by data transmitted from the second cell, wherein the first type of interference cancellation is different than the second type of interference cancellation; and repeating the iteration of the hybrid interference cancelation based decoding until an attempt to decode the data transmitted from the first cell is successful or a maximum number of iterations has been reached.

28. A method for wireless communication, comprising:

performing a first attempt to decode data transmitted from a first cell;

if the first attempt to decode is unsuccessful, performing a first type of interference cancellation using results of the first attempt to decode data transmitted from the first cell to reduce interference caused by data transmitted from the first cell;

attempting to process data transmitted from at least a second cell after performing the first type of interference cancellation;

performing a second type of interference cancellation using results of the attempt to process data transmitted from the second cell to reduce interference caused by data transmitted from the second cell, wherein the first type of interference cancellation is different than the second type of interference cancellation; and performing a second attempt to decode data transmitted in the first cell after performing the second type of interference cancellation.

29. An apparatus for wireless communication, comprising:

means for performing a first attempt to decode data transmitted from a first cell;

means for performing a first type of interference cancellation using results of the first attempt to decode data transmitted from the first cell to reduce interference caused by data transmitted from the first cell, if the first attempt to decode is unsuccessful;

means for attempting to process data transmitted from at least a second cell after performing the first type of interference cancellation;

means for performing a second type of interference cancellation using results of the attempt to process data transmitted from the second cell to reduce interference caused by data transmitted from the second cell, wherein the first type of interference cancellation is different than the second type of interference cancellation; and means for performing a second attempt to decode data transmitted in the first cell after performing the second type of interference cancellation.

30. A non-transitory computer-readable medium comprising code for:

performing a first attempt to decode data transmitted from a first cell;

if the first attempt to decode is unsuccessful, performing a first type of interference cancellation using results of the first attempt to decode data transmitted from the first cell to reduce interference caused by data transmitted from the first cell;

attempting to process data transmitted from at least a second cell after performing the first type of interference cancellation;

performing a second type of interference cancellation using results of the attempt to process data transmitted from the second cell to reduce interference caused by data transmitted from the second cell, wherein the first type of interference cancellation is different than the second type of interference cancellation; and performing a second attempt to decode data transmitted in the first cell after performing the second type of interference cancellation.

31. An apparatus for wireless communication, comprising: a processing system configured to:

perform a first attempt to decode data transmitted from a first cell;

if the first attempt to decode is unsuccessful, perform a first type of interference cancellation using results of the first attempt to decode data transmitted from the first cell to reduce interference caused by data transmitted from the first cell;

attempt to process data transmitted from at least a second cell after performing the first type of interference cancellation;

perform a second type of interference cancellation using results of the attempt to process data transmitted from the second cell to reduce interference caused by data transmitted from the second cell, wherein the first type of interference cancellation is different than the second type of interference cancellation; and perform a second attempt to decode data transmitted in the first cell after performing the second type of interference cancellation.

* * * * *